United States Patent [19]

Schneider et al.

[11] 3,733,913
[45] May 22, 1973

[54] WINDSHIELD WIPER ASSEMBLY FOR VEHICLES, PARTICULARLY FOR MOTOR VEHICLES

[76] Inventors: Theodor Schneider, 30 Seestr., 7121 Freudental; Willy Bock, 16 Erwin-Balz Str.; Karl-Friedrich Schubert, 10 Friedrich-Naumann-Str., both of 712 Bietigheim, all of Germany

[22] Filed: Aug. 26, 1971

[21] Appl. No.: 175,140

[30] Foreign Application Priority Data

Oct. 3, 1970 Germany.....................P 20 48 717.6

[52] U.S. Cl....................74/78, 15/250.27, 310/112
[51] Int. Cl..............................................F16h 21/40
[58] Field of Search ............................74/78; 68/27; 15/250.30, 250.27; 310/112, 83

[56] References Cited

UNITED STATES PATENTS

| | | |
|---|---|---|
| 2,100,188 | 11/1937 | Hansmann................................74/78 |
| 1,445,853 | 2/1923 | Shaw et al. ...............................74/78 |
| 1,813,656 | 7/1931 | Blake et al..............................310/112 |
| 1,832,560 | 11/1931 | Kendig...................................68/27 |
| 2,511,946 | 6/1950 | Sacchini............................15/250.27 |

Primary Examiner—Charles J. Myhre
Assistant Examiner—Wesley S. Ratliff, Jr.
Attorney—John J. McGlew et al.

[57] ABSTRACT

A windshield wiper assembly includes a central casing or housing for a rotary electric motor with the rotor mounted around the shaft which extends outwardly and is supported on a roller bearing at each end of the housing. The portion of the shaft which extends outwardly on each end carries a worm which engages with a quadrant gear of an oscillating drive mechanism. The oscillating drive mechanism is contained in the housing at each end of the central casing, the housing also forms a bearing support for the windshield wiper blades and which carries the oscillatable drive mechanism which is connected to the bearing support to oscillate the windshield wipers.

15 Claims, 3 Drawing Figures

Inventors
THEODOR SCHNEIDER
WILLY BOCK
KARL-FRIEDRICH SCHUBERT
BY
John J. McGlew
ATTORNEY

WINDSHIELD WIPER ASSEMBLY FOR VEHICLES, PARTICULARLY FOR MOTOR VEHICLES

BACKGROUND OF THE INVENTION

1. Field of the invention

This invention relates in general to the construction of windshield wipers and in particular, to a new and useful windshield wiper assembly which includes a housing on each side of a central motor housing which carries the oscillating mechanism which is driven by the motor shaft extending into each side housing, the side housings forming a rotatable mounting for the windshield wipers on each side end of the shaft.

2. Description of the Prior Art

Different windshield wiper assemblies for motor vehicles are known where the electro-motor revolves continuously if necessary and the oscillating rotary movement for the wiper bearings are produced through mechanical driving connections to the shaft of the motor. For this purpose are used mostly cranks and linkages which establish the coupling from the drive shaft of the electro-motor to the wiper bearings which are secured on the body of the car. The installation of such windshield wiper drive requires much assembly work and also requires a great deal of space even if the drive shaft of the electro-motor is connected to directly connect the oscillating drive from which the various linkages to the wiper bearings are moved. Another difficulty is added if the two wiper bearings of a car must be controlled for movement in opposite rotational directions.

SUMMARY OF THE INVENTION

In accordance with the present invention there is provided a simplified windshield assembly for vehicles which includes a centrally arranged electro-motor housing with an electro-motor rotor surrounding the rotor shaft and with a shaft which extends out each end of the housing into a housing for the oscillating mechanism and for the mounting the bearing of the windshield blades which are arranged at each end of the motor housing. The arrangement of the wiper bearings at each end of a rotating shaft reduces the assembly work which is required for the two windshield wiper blades and it requires less space and is less costly. In an embodiment of the invention the driving motor carries a worm at each end which drives a gear connected to the oscillation linkage which in turn is connected to drive the bearing for the windshield wiper blades through an oscillation movement. The whole assembly including the housings for the oscillation mechanism and the bearing mountings together with the central motor housing positioned therebetween may be mounted as single assembly on the automobile so that additional mounting frames of the separate mounting of the electric motor and each windshield wiper bearing is not necessary because a separate oscillating drive is associated with each wiper bearing, the parts of the drive may correspondingly be weaker and less expensive.

The construction of the assembly is such that the length of the drive shaft of the electro-motor and the distance between the two wiper bearings of the oscillating drive housing are adapted to the desired installation measurements for the wiper bearings. The housings for the two oscillating drives carry flanges which are designed as end faces for the casing of the electro-motor. Due to this arrangement the fastening means between the flanges and the electric motor casing is eliminated and the oscillating drives are always positively aligned in respect to each other. The unit can be very flat if according to one embodiment the gear wheels, connecting rods, tooth segments, toggle joints, and the gear wheel for the wiper bearings or wiper blade holding sleeves of the oscillating drives are arranged practically in one action plane which extends parallel to the longitudinal axis of the drive shaft and from which plane the wiper bearings project perpendicularly.

The oscillating drives for the wipers comprise according to one embodiment and gear wheel which is coupled to the driving worm defined on the associated end of the drive shaft. The gear wheel carries an eccentrically arranged bearing pin for a connecting rod of a tooth segment which drivingly engages a gear secured on the bearing for the wiper blade. With such a design oscillating of the two wiper blades in either direction may be accomplished.

The drive may be carried out in many ways. The driving worm of the drive shaft can be arranged to drive the gear wheels of the oscillating drives which may be coupled therewith in the same or in an opposite direction of rotation. Another possibility is to arrange the bearing pins for the connecting rods on the gear wheels of the two oscillating drives at the same angle or at an angle displaced from each other by 180° so that one wiper oscillates at a different time than the other.

With still another arrangement, the toothed segments of the connecting rods can be arranged to drive the gear wheels connected with the wiper bearings in the same or in the opposite directions. In view of the great number of possibilities of the use of the oscillating drive, with the same or equal number of parts it is possible simply by assembling them in the oscillating drive to drive the two wiper bearings in the same or in an opposite direction. This increases the universal application of the driving unit.

Accordingly, it is an object of the invention to provide an improved drive for a pair of windshield wiper blades which includes a central housing with a driving motor driving a shaft having an extension at each end arranged in an oscillating drive housing for each wiper blade and with an oscillatable mechanism driven by the shaft arranged in each wiper housing.

A further object of the invention is to provide a drive for windshield wiper blades which includes a mechanism at each end of a drive shaft which housed in a wiper blade housing forming the mounting for the bearings of the wiper blade.

A further object of the invention is to provide a wiper blade mechanism which is simple in design, rugged in construction and economical to manufacture.

The various features of novelty which characterize the invention are pointed out with particularity in the claims annexed to an forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
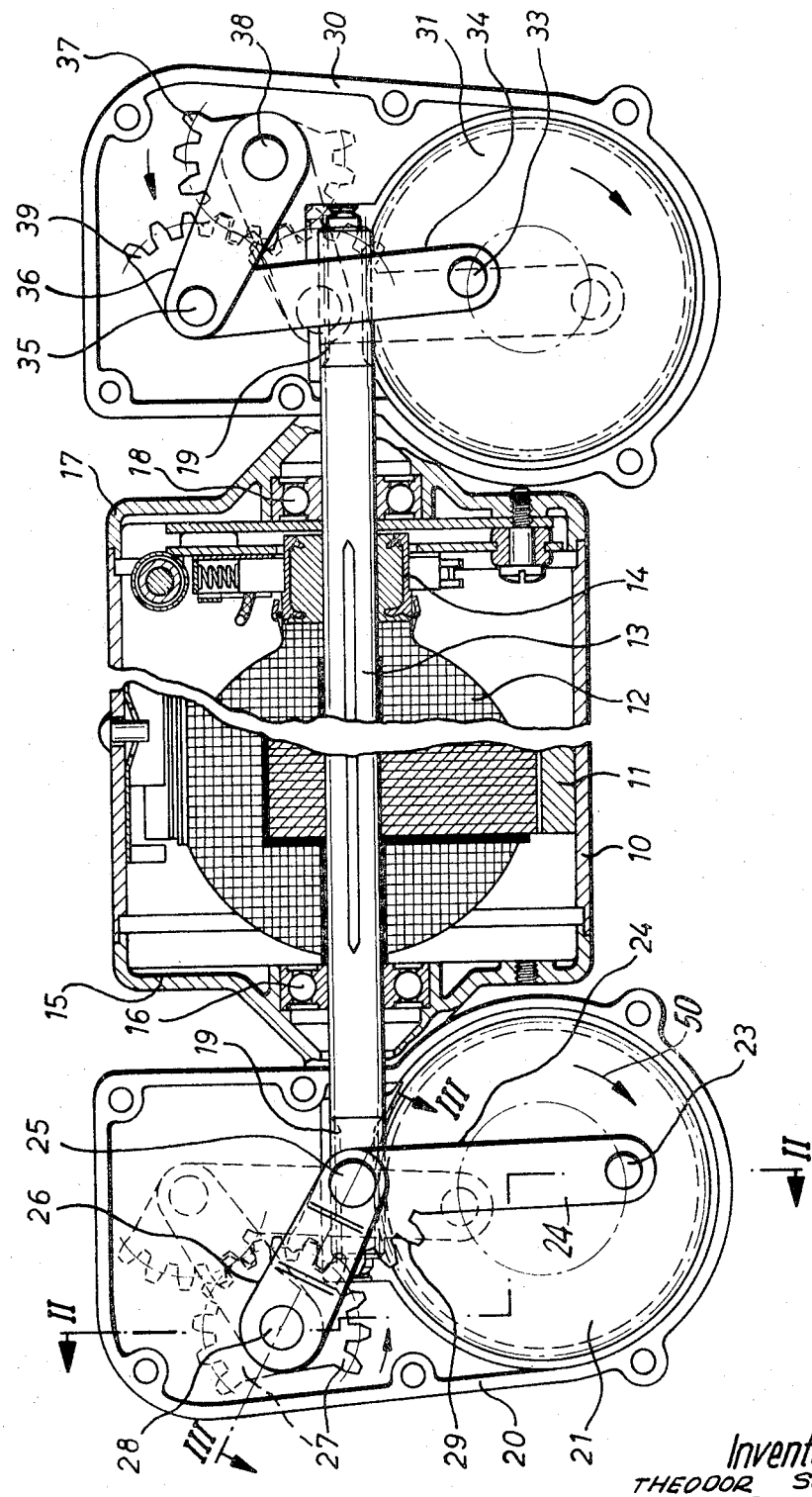
FIG. 1 is an axial sectional view of a windshield wiper assembly for the two wiper blades constructed in accordance with the invention.

Referring to the drawings in particular, the invention embodied therein, as indicated in the drawings, comprises a central motor casing 10 in which is positioned an electric motor stator 11 which is energized to rotate a rotor 12 affixed to an electric motor drive shaft 13.

In accordance with a feature of the invention the drive shaft 13 extends beyond the ends of flanges 15 and 17 of the motor casing 12 through associated bearings 16 and 18 and into respective housings 20 and 30 for the oscillating mechanism to drive an associated window wiper.

The drive shaft 13 carries a driving worm 19 at each end which engages with the oscillation mechanism contained within the housing 20 at one end and within the housing 30 at the opposite end. The flanges 15 and 17 of the motor casing 10 are constructed so that it is possible to fix the position of the housings 20 and 30 at a desired spacing on each end of the housing 10.

Figure 2:
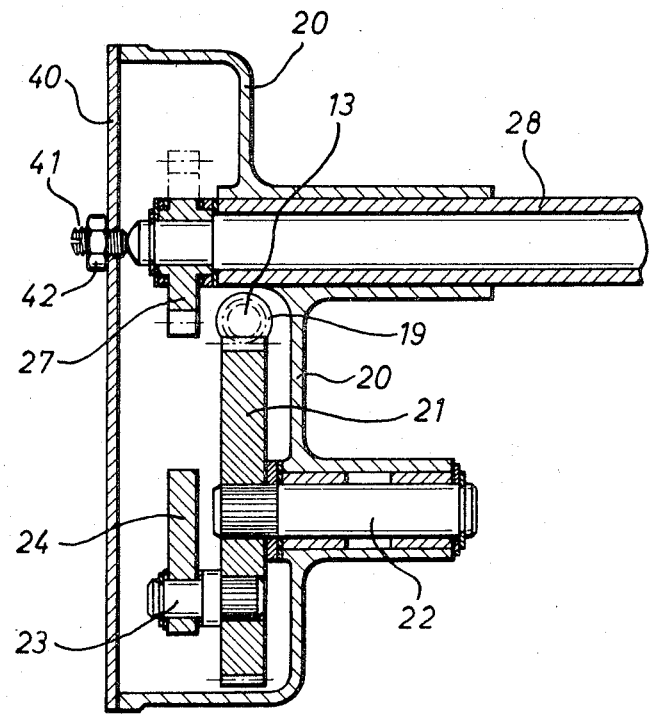
FIG. 2 is a section taken along the line II—II of FIG. 1.
Figure 3:
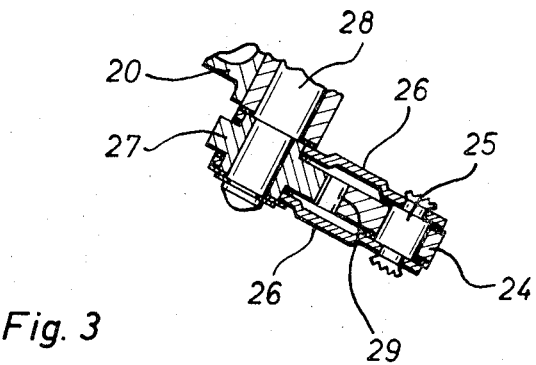
FIG. 3 is a section taken along the line III—III of FIG. 1.

The housing 20 carries a gear wheel 21 which is rotatably mounted on pin 22 which is journalled in the housing front wall as shown in FIG. 2. The gear wheel 21 meshes with the driving worm 19 and the drive shaft 13 and performs, in a continuous run, of the electric motor, the rotary movement indicated by the arrow 50 shown in FIG. 1. The gear wheel 21 carries an eccentrically located pin 23 which is articulated to a connecting rod 24. During the rotation of the gear wheel 21 the bearing pin 23 describes a circular path and shifts the connecting rod 24 which has an opposite end which is formed as a toothed segment 29. The toothed segment 29 is maintained by meshing engagement with a gear wheel 27 which is connected to a bearing 28 which accomodates the shaft of the wiper blade and which supports the wiper blade for oscillatable movement with the bearing 28. A toggle leg 26 is articulated at one end to the center of the toothed segment 29 and at its opposite end to the center of the gear wheel 27 so that it forms a double butt strap as indicated in FIG. 3. The toggle lever 26 includes the two strap parts which enclose the toothed segment 29 and the gear wheel 27 on both sides. A bearing pin 25 locks the but strap part rotatbly on the connecting rod 24 and the other ends of the butt straps are guided directly on the wiper bearing 27. If the connecting rod is moved upwardly from the solid position to the dotted line position shown in FIG. 1 during the clockwise rotation of the gear wheel 23, the toothed segment 29 effects a rotation of the wiper bearing through the engagement of the gear wheel 27 in a counter clockwise direction.

A similar oscillation mechanism is contained in the housing 30. In this construction, there is a gear wheel 31 coupled with a driving worm 19 of the shaft 13 which is in turn in the same direction as the gear wheel 21. The bearing pin 33 for connecting rod 34 is arranged on the gear wheel 31 at a location displaced approximately 180° from the location of the comparable pin 23 and the gear 21. This means that the connecting rod 34 is moved from a solid line position shown in the drawings of FIG. 1 downward into the position shown in dotted lines during the same phase period of movement of the gear 21. Because the toothed segment 29 is arranged on the other side of the connecting rod 34 the gear wheel 37 of the wiper bearing 38 is turned counter clockwise.

In the represented drive of two gear wheels 21 and 31 the two wiper bearings 28 and 38 perform a rotary oscillating movement in the same direction. It is possible, however, to arrange the bearing pins 23 and 33 on the gear wheels 21 and 31 at the same angle in which an opposite rotary oscillating movement can be achieved for the wiper bearings 28 and 38 and the associated wiper blades. This simple change of the type of movement may be achieved very easily upon the installation of the parts.

The same effect can also be achieved by driving the gear wheels 21 and 31 in different directions by the corresponding construction of the driving worms 19 and the associated gear wheels. The engagement between the driving toothed segment 29 and the gear 27 also determines the direction of movement of the wiper bearing oscillation in dependence on which side of the wiper bearing axis the point of engagement is located.

The complete unit may be made substantially flat if the gear wheels 21 and 31, the connecting rods 24 and 34, the toothed segments 29 and 39, the toggle joints 26 and 36, and the gear wheels 27 and 37 are arranged practically in one action plane parallel to the longitudinal axis of the drive shaft. The wiper bearings 28 can be made to project outwardly from either side of the housing 20 or 30.

As seen in FIG. 2, the housing 20 and 30 of the oscillating drives are closed by a cover plate such as the plate 40 which carries an adjusting screw 41 with a lock nut 42. The axial plate of the drive shaft 13 can be adjusted by the screw 41.

While a spcific embodiment of the invention has been shown and described in detail to illustrate the application of the principles of the invention, it will be understood that the invention may be embodied otherwise without departing from such principles.

What is claimed is:

1. A vehicle windshield wiper assembly, comprising an electric motor having a rotatable single rigid drive shaft having a driving gear at each end, a windshield wiper bearing adjacent each end of said shaft, and an oscillating drive connected between said driving gear and said windshield wiper bearings adjacent each end of said shaft, housing means for said motor said windshield wiper bearings and said oscillating drive, and means on said housing means for securing said housing means as a unit on the vehicle for positioning both bearings on operative positions thereon.

2. A windshield wiper assembly, comprising an electric motor having a rotatable drive shaft having a driving geat ar each end, a windshield wiper bearing adjacent each end of said shaft, and an oscillating drive connected between said driving gear and said windshield wiper bearings adjacent each end of said shaft, an intermediate housing for said electric motor having an opening at each end through which said shaft extends, and an oscillating-gear-and-windshield-bearing housing surrounding each end of said shaft and carry said oscillating drive and said windshield wiper bearing, said housings being arranged directly adjacent each other and being fastenable as a unit to the vehicle.

3. A windshield wiper assembly, comprising an electric motor having a rotatable drive shaft having a driving gear at each end, a windshield wiper bearing adjacent each end of said shaft, and an oscillating drive connected between said driving gear and said windshield wiper bearings adjacent each end of said shaft, wherein said oscillating drive comprises a rotatable gear, said drive shaft having a driving gear in the form of a worm engaged with said rotatable gear, a bearing pin eccentrically carried on a side thereof, a connecting rod connected to said bearing pin and having a toothed segment formed at its opposite end, a windshield wiper bearing gear carried on said windshield bearing and engaged with said segment, and a toggle joint articulated to the center of said bearing gear and said toothed segment.

4. A windshield wiper assembly, according to claim 3, wherein said toggle joint comprises a double butt strap enclosing said toothed segment and said bearing gear.

5. A vehicle windshield wiper assembly, comprising a central motor housing portion having an electrical stator, a single rigid shaft extending through said housing and being rotatably supported therein and having an electric rotor thereon for rotation upon energization of said stator, said rotor shaft extending outwardly from each end of said housing, a first oscillating-drive-and-windshield-wiper-bearing housing portion arranged around one end of said shaft, a second oscillating drive and windshield wiper bearing housing portion arranged around the opposite end of said shaft, an operating gear rotatable in each of said first and second housings and driven by said shaft, a segment member connected to said gear on one side thereof at an eccentric location and being oscillated by rotation of said gear, a windshield wiper bearing in each of said first and second housing portions for oscillatably carrying a respective windshield wiper and having windshield wiper drive gear thereon located within respective said first and second housing portions, said wiper drive gear being connected to said segment member and being driven thereby to oscillate said windshield wiper bearing, said first and second housing portions forming a unit adapted to be secured to the vehicle for positioning said windshield wiper bearings in operative positions thereon.

6. A windshield wiper assembly, according to claim 5, wherein said shaft has a worm at each end engaged with said operating gear and wherein said gears in said first and second housing portions each rotate in the same direction.

7. A windshield wiper assembly, according to claim 5, wherein said shaft has a worm at each end driving respective ones of said gears in said first and second housing portions, said gears in respective said first and second housing portions being driven in opposite directions.

8. A windshield wiper assembly, according to claim 5, wherein said segment member in said first housing portion is connected to the same side of the associated gear as said segment member of said second housing portion and they are arranged on their associated gear wheels at the same angular location relative to each other.

9. A windshield wiper assembly, according to claim 5, wherein said toothed segments are arranged to drive said gear wheels of said first and second housings housing portions in respective opposite directions.

10. A windshield wiper assembly, according to claim 5, wherein said bearing pins of said gears are displaced by 180° in respective first and second housing portions.

11. A windshield wiper assembly, according to claim 5, wherein said toothed segments drive said gear wheels in the same direction in said first and second housing positions.

12. A windshield wiper assembly, according to claim 5, wherein said toothed segments drive said gear wheels of said first and second housing portions in opposite directions.

13. A windshield wiper assembly, according to claim 5, wherein said main motor housing portion carries end flanges at each end rotatable support bearings for said motor drive shaft.

14. A windshield wiper assembly, according to claim 5, wherein said main motor housing portion includes means for aligning said shaft for positioning said first and second housing portions.

15. A windshield wiper assembly, according to claim 5, wherein said operating gears, said connecting rods with said toothed segment and said bearing gears are all arranged in substantially one action plane parallel to the longitudinal axis of said drive shaft.

* * * * *